United States Patent

Blum

[15] 3,667,701

[45] June 6, 1972

[54] MAGNETIC TAPE APPARATUS

[72] Inventor: James E. Blum, Sunnyvale, Calif.

[73] Assignee: Cybercom Corporation, Sunnyvale, Calif.

[22] Filed: May 7, 1970

[21] Appl. No.: 35,356

[52] U.S. Cl. ..........242/192, 274/11 C

[51] Int. Cl. ..........G03b 1/04, G11b 15/32

[58] Field of Search ..........242/55.19 A, 192, 194, 197–206; 179/100.2 Z; 274/4 B, 4 C, 11 B, 11 C

[56] References Cited

UNITED STATES PATENTS

| | | | |
|---|---|---|---|
| 3,417,938 | 12/1968 | Markakis et al. | 242/200 |
| 3,348,786 | 10/1967 | Miller et al. | 242/200 |
| 3,497,157 | 2/1970 | Hanes et al. | 242/200 X |
| 2,867,389 | 1/1959 | Viets | 242/199 |
| 2,926,861 | 3/1960 | Murdoch | 242/200 |
| 3,367,592 | 2/1968 | Smith | 242/194 |

FOREIGN PATENTS OR APPLICATIONS

| | | | |
|---|---|---|---|
| 1,195,069 | 6/1965 | Germany | 242/198 |

*Primary Examiner*—Leonard D. Christian
*Attorney*—Flehr, Hohbach, Test, Albritton & Herbert

[57] ABSTRACT

Magnetic tape apparatus including a tape magazine having takeup and supply reels whose rims are engaged by constant-torque slip clutches which are concurrently engaged with the reels driving them in opposite directions to maintain the length of tape extending between the reels in a tension condition. Means for driving the tape back and forth include a shuttle bar having idler rollers which move alternatively between two counter-rotating capstans to engage two guide rollers mounted in the magazine itself to move the tape in a forward or reverse direction.

1 Claims, 6 Drawing Figures

INVENTOR.
JAMES E. BLUM
BY
Fiehr, Hohbach, Test, Albritton & Herbert
ATTORNEYS

INVENTOR.
JAMES E. BLUM
Flehr, Hohbach, Test, Albritton & Herbert
ATTORNEYS

MAGNETIC TAPE APPARATUS

BACKGROUND OF THE INVENTION

The present invention is directed in general to magnetic tape apparatus and more particularly to apparatus using a tape magazine where the tape can easily be driven in forward and reverse directions.

Standard tape cartridges or magazines now commercially available are inadequate for recording digital information. Such cartridges and their associated driving apparatus do not index accurately and rapidly enough. Moreover, they lack facility for fast reversal of tape movement.

OBJECTS AND SUMMARY OF THE INVENTION

It is, therefore, a general object of the present invention to provide an improved magnetic tape apparatus.

It is another object of the invention to provide a tape apparatus which has an improved capability for recording digital information and may be easily operated in both forward and reverse modes.

In accordance with the above objects there is provided magnetic tape apparatus comprising a magnetic tape having takeup and supply reels engaged by the tape. Guide means are included in the magazine for the length of tape extending between the reels. First and second driving means are disposed adjacent the magazine for selectively driving the tape in respectively forward and reverse directions. Means are provided for selectively causing the first and second driving means to actively engage the tape. A third driving means is provided for the takeup reel and a fourth driving means for the supply reel, the third and fourth driving means having concurrent frictional driving engagement with the respective reels. The frictional forces of the third and fourth driving means are substantially equal and opposite whereby the tension is continuously maintained in the length of tape extending between the reels.

DETAILED DESCRIPTION OF THE PREFERRED EMBODIMENT

Figure 1:
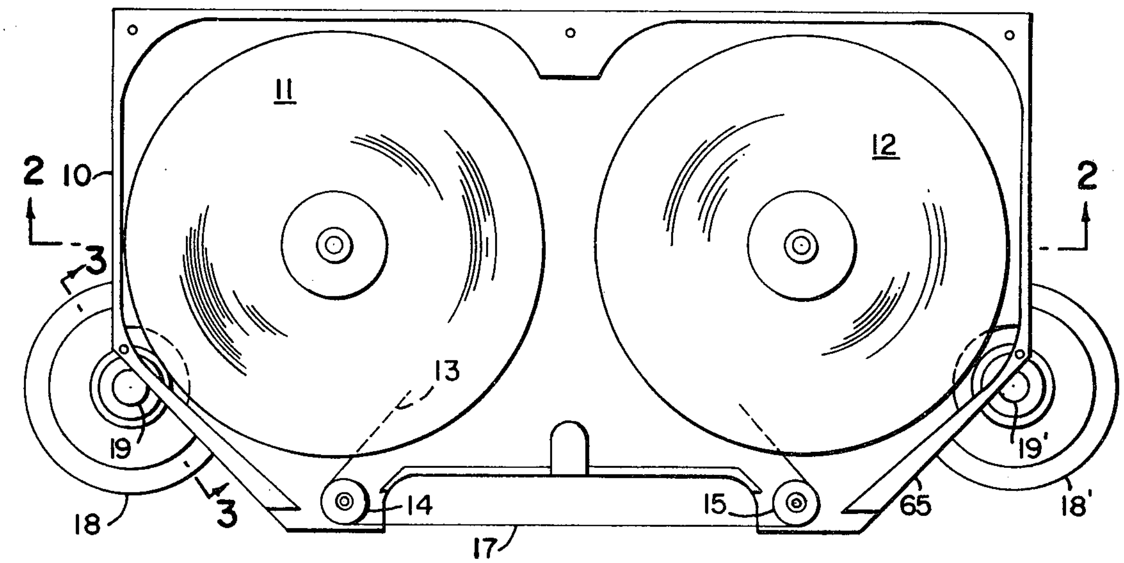
FIG. 1 is a plan view of a tape magazine embodying the present invention with its top cover removed and in addition two frictional driving means are shown engaged with the magazine.

Referring first to FIG. 1, there is shown a tape magazine or cartridge which includes a housing 10 having a takeup reel 12 and a supply reel 11. Each reel is shown with a supply of rolled magnetic tape 13 which is fed around roller type guide means 14 and 15 mounted on housing 10 to expose a length of tape designated 17 at the front of the magazine housing 10 for engagement by the record or playback magnetic transducers. Rollers 14 and 15 also serve, as will be explained below, as idler wheels for driving the tape 13 in either one direction or the other. They are normally crowned to aid in tape guidance.

Driving means 18 and 18' are provided for maintaining tension in the tape length 17 and also to aid in rewind procedure. They include shafts 19 and 19' which engage the respective rims of takeup and supply reels 11 and 12. These driving means are in concurrent frictional driving engagement with their respective reels. The frictional forces of the driving means 18 and 18' are substantially equal and opposite. In other words they provide equal constant torques on the two reels.

Figure 3:
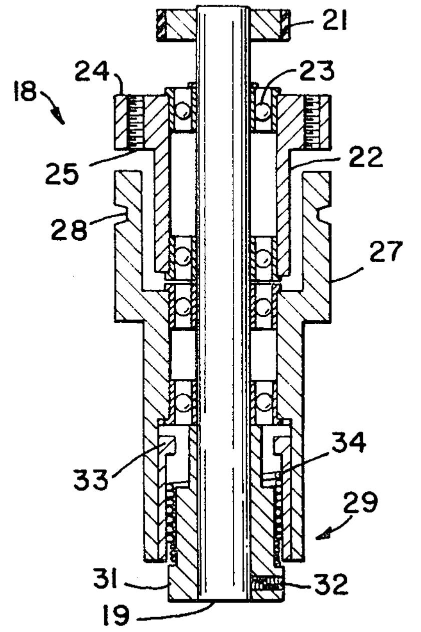
FIG. 3 is an enlarged cross-sectional view of the third or fourth driving means of the present invention taken along the line 3—3 of FIG. 1.
Figure 4:
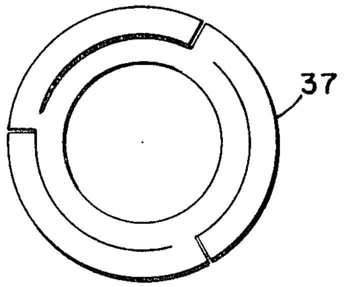
FIG. 4 is a plan view of a spring washer used in FIG. 2.

FIG. 3 shows a cross sectional view of the driving means 18 which includes in addition to the shaft 19 a rubber collar or puck 21 which radially engages the rim of supply reel 11. Shaft 19 is mounted to the structural frame of the tape apparatus by bearing means 22 which include bearings 23 and annular ring portion 24 with threaded holes 25 for mounting to the frame. Pulley means 27 are mounted for rotation on shaft 19 and include a groove 28 on which a driving belt may be placed.

A constant torque is provided between pulley 27 and shaft 19 by a slip clutch 29. One surface of the clutch is provided by a cylindrical sleeve 31 fixed to shaft 19 by a set screw 32. The other surface is a cap shaped plastic insert 33 friction fit inside of the end of pulley 27 for rotation with the pulley. A helically wound spring 34 provides a predetermined torque between insert 33 and sleeve 31. Constant torque slip clutches of other types would of course be satisfactory.

Figure 2:
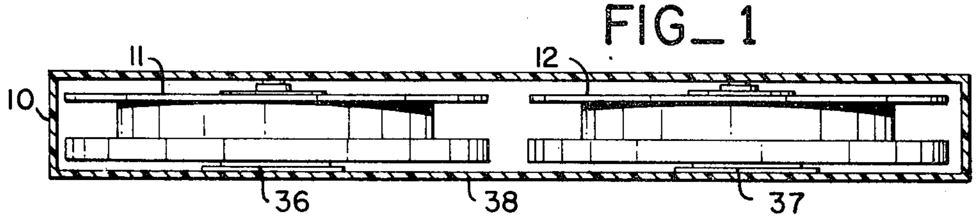
FIG. 2 is a cross sectional view generally taken along the line 2—2 of FIG. 1 with a top cover present.

Referring now to FIG. 2, the takeup and supply reels 11, 12 also are retarded by a frictional means which includes spring washers 36 and 37 mounted for rotation against the bottom 38 of the housing 10. These washers provide a frictional torque against rotation of the reels when the cartridge is removed from the tape driving apparatus. Thus the torque resisting rotation of the reels contributed by the washers, approximately one-half to three-quarters oz-in., is relatively small compared to other torques in the system.

Figure 5:
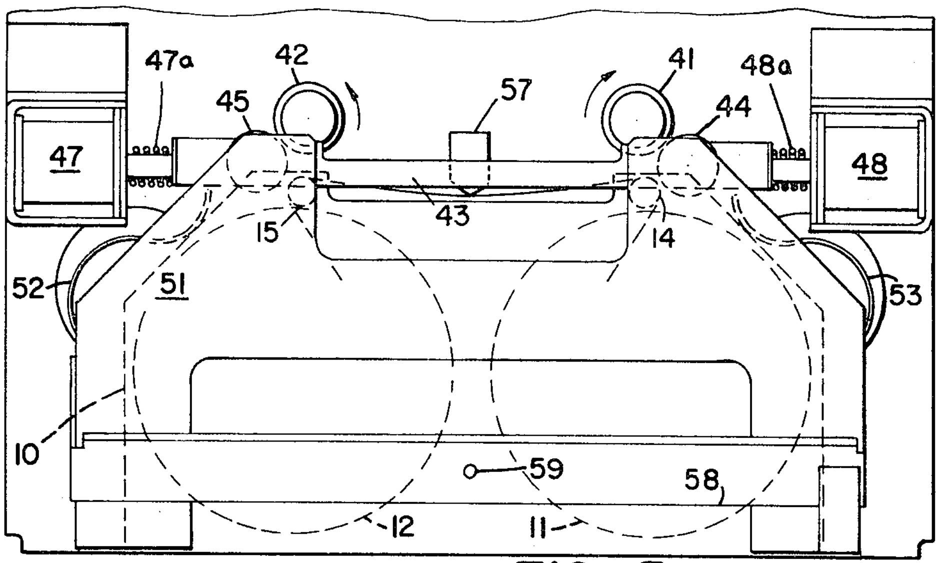
FIG. 5 is a plan view of a tape magazine embodying the present invention as it would appear inserted in the remaining tape apparatus embodying the present invention.

FIG. 5 illustrates the tape cartridge of FIG. 1 as it would be inserted into the overall magnetic tape apparatus of the present invention. First and second tape driving means 41 and 42 in the form of counter-rotating capstans are disposed adjacent the magazine 10 for selectively driving the tape in respectively forward and reverse directions. A shuttle bar 43 carries idler rollers 44 and 45 which in the position shown are disengaged from driving capstans 41 and 42 and the rollers 14 and 15 on magazine housing 10 by compression springs 47a and 48a which maintain the shuttle bar 43 in a neutral position. Shuttle bar 43 is moved either toward the left or the right by solenoids 47 and 48 which engage the shuttle bar at its ends. Specifically, actuation of solenoid 47 causes the shuttle bar to move to the left with the idler wheel 44 engaging driving capstan 41 and roller 14. The tape will then move from left to right with reel 11 being the takeup reel. Similarly, with solenoid 48 actuated, idler wheel 45 is engaged with driving capstan 42 and roller 15 to cause the tape to move from right to left or in a opposite direction.

The magazine housing 10 is retained by a cartridge guide 51 in which the magazine housing is inserted. The slot means also includes leaf spring means 52, 53 ejecting the magazine 10 from the slot means.

When the cartridge has been inserted in the slot in guide 51 to its full extent so that the tape portion 13 is engaged with the head or transducer means 57, a rocker arm 58 mounted on cartridge guide 51 causes a pin 59 on the rocker arm to engage a hole (not shown) in the cartridge housing in its top cover to detent or retain the magazine or cartridge in the overall tape apparatus. Removal of the magazine is accomplished merely by rocking the rocker arm 58 up again by some convenient lever (not shown) and the springs 52, 53 will cause the cartridge to be ejected.

Figure 6:
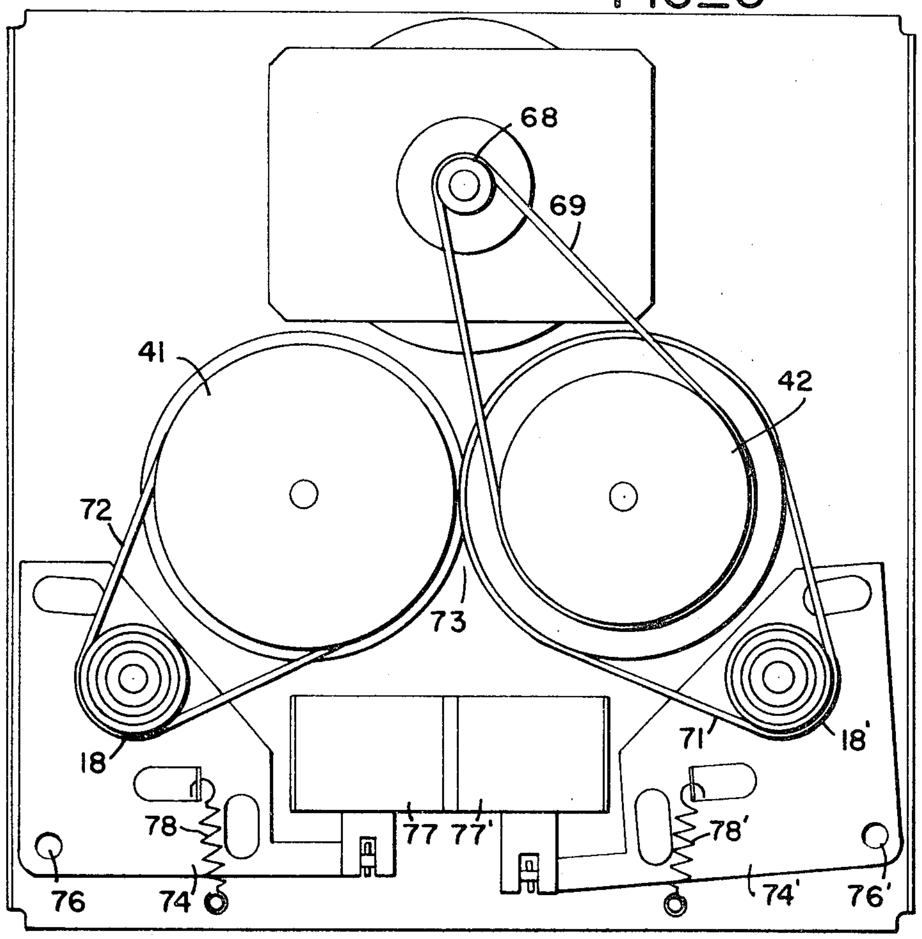
FIG. 6 is a plan view of the driving pulleys used in the present invention.

FIG. 6 shows the drive train for the various driving means of the present invention and includes a motor 68 coupled by a belt 69 to drive the pulley 42. Driving pulley 42 is coupled by a belt 71 to frictional driving means 18'. Similarly, driving wheel 41 is coupled by belt 72 to frictional driving means 18. Driving wheel 42 drives wheel 41 by frictional engagement between them at 73.

Both of the driving means 18 and 18' are mounted on rotatable plates 74, 74' which are pivoted at 76, 76' and spring biased by springs 78 and 78' to normally force the driving means 18 and 18' into engagement with the reels. Solenoids 77, 77', when actuated rotate the plates 74, 74' to selectively move driving means 18 and 18' out of engagement with their respective reels 11, 12.

In operation, the driving means 18 and 18' act as slip clutches and are normally in continuous functional driving engagement with their respective reels. The friction torque of the slip clutches is approximately 1.1 ounce-inches ±10 percent. Thus, these driving or frictional forces are substantially equal.

In its nonoperative condition, the shuttle bar 43 maintains both of the driving wheels 41 and 42 out of effective engagement with the rollers 14, 15 of the magazine. In this condition the takeup and supply reels 11 and 12 do not move even though engaged by slip clutches 18, 18' due to the system friction of the overall system. This includes the 0.5 – 0.75 ounce-inch frictional torque of the spring washers 36, 37 on the reels, the friction of the bearing system of the reels, and friction contributed by the tape itself. This so-called system friction may be as much as four to five ounces. Moreover, the equal and opposite torque contributed by the driving slip clutches 18, 18' is sufficient to maintain tension in the length of tape between rollers 14, 15 as shown in FIG. 1. Thus, a type of symmetrical dynamic balance is maintained in the overall system. Energization of either solenoid 47 or 48 (FIG. 5) will immediately cause movement of the tape in a forward or reverse direction. This is accomplished with a minimum acceleration time because of the dynamic balance of the system. In addition, de-energization of the solenoids allows the system friction to immediately bring the tape to a stop.

Because of the difference in size between the puck 21 of the clutches and the reels 11, 12, the 1.1 oz.in torque of the clutches is multiplied by the difference in diameters;

$$1.1 \times \frac{3 \text{ (DIA. of Reels)}}{.582 \text{ (DIA. of Pucks)}} = 5.67 \text{ oz. in}$$

The actual tension force on the tape itself varies in accordance with its radius. For example with a 1 inch radius tape roll the force is 5.67 ounces and with a 1.5 inch radius tape roll the force is 3.8 ounces. In normal operation with the foregoing difference in tape roll sizes the maximum differential force on the tape is 2 ounces; this is easily overcome by the system friction of 4–5 ounces.

Fast forward and fast rewind operation is provided by selective disengagement of slip clutches 18, 18' from a reel. This allows the remaining engaged clutch to rapidly move its reel in a rewind or fast forward mode. Capstan drive is not used.

Thus, the invention provides a simple and economical magnetic tape apparatus which has an improved capability for recording digital information which can be easily operated in both forward and reverse modes.

I claim:

1. Magnetic tape apparatus comprising, a magnetic tape magazine having takeup and supply reels engaged by the tape, guide means included in said magazine for the length of the tape extending between the reels, first and second tape driving means disposed adjacent said magazine for selectively driving said tape in respectively forward and reverse directions, means for selectively causing said first and second dirving means to actively engage said tape, third driving means for said takeup reel, fourth driving means for said supply reel, said third and fourth driving means having concurrent frictional driving engagement with said respective reels the frictional forces of said third and fourth driving means being substantially equal and opposite whereby tension is continuously maintained in said length of tape extending between said reels, said means for engaging said first and second tape driving means including shuttle bar means, movement of said shuttle bar means in one direction causing the concurrent engagement of one of said first and second driving means with said tape and the disengagement of the other driving means and movement of said shuttle bar means in the other direction causing engagement of the other driving means and disengagement of the one driving means from said tape.

* * * * *